United States Patent
Fischer

(10) Patent No.: US 11,977,558 B2
(45) Date of Patent: May 7, 2024

(54) DEVICE AND METHOD FOR COUPLING A MACHINE TO A PLURALITY OF APPLICATIONS

(71) Applicant: Siemens Aktiengesellschaft, Munich (DE)

(72) Inventor: Jan-Gregor Fischer, Zorneding (DE)

(73) Assignee: SIEMENS AKTIENGESELLSCHAFT (DE)

( * ) Notice: Subject to any disclaimer, the term of this patent is extended or adjusted under 35 U.S.C. 154(b) by 280 days.

(21) Appl. No.: 16/640,366

(22) PCT Filed: Jul. 10, 2018

(86) PCT No.: PCT/EP2018/068699
§ 371 (c)(1),
(2) Date: Feb. 20, 2020

(87) PCT Pub. No.: WO2019/037936
PCT Pub. Date: Feb. 28, 2019

(65) Prior Publication Data
US 2020/0175031 A1    Jun. 4, 2020

(30) Foreign Application Priority Data
Aug. 22, 2017  (EP) .................................. 17187207

(51) Int. Cl.
*G06F 16/00* (2019.01)
*G05B 19/042* (2006.01)
*G06F 16/25* (2019.01)

(52) U.S. Cl.
CPC ....... *G06F 16/258* (2019.01); *G05B 19/0423* (2013.01); *G05B 2219/21109* (2013.01)

(58) Field of Classification Search
None
See application file for complete search history.

(56) References Cited

U.S. PATENT DOCUMENTS 9,280,788 B2 *  3/2016  Ferrari .................. G06Q 30/06
9,449,068 B2 *  9/2016  Ferrari .................. G06F 16/284
(Continued)

FOREIGN PATENT DOCUMENTS

CN    101156406 A    4/2008
CN    102682122 A    9/2012
(Continued)

OTHER PUBLICATIONS

PCT International Search Report dated Oct. 22, 2018 corresponding to PCT International Application No. PCT/EP2018/068699 filed Oct. 7, 2018.
(Continued)

*Primary Examiner* — Farhan M Syed
(74) *Attorney, Agent, or Firm* — Schmeiser, Olsen & Watts LLP

(57) ABSTRACT

A device for coupling a machine, in particular a machine tool, having a number N of data sources for providing data of the machine in data source-specific file formats having a plurality of applications is provided. The device includes a transformation unit, which is designed to transform data of one of the N data sources present in one of the data source-specific data formats to data of a generic semantic data model for at least one of the applications and data of one of the applications present in the generic semantic data model to data of one of the data source-specific data formats for one of the N data sources. The transformation unit thus advantageously establishes data interoperability between the respective application and the respective data source of the machine. Also provided is a method and to a computer program product for coupling a machine to a plurality of applications.

9 Claims, 5 Drawing Sheets

(56) References Cited

U.S. PATENT DOCUMENTS

| | | | |
|---|---|---|---|
| 9,953,085 B1* | 4/2018 | Collins | G06F 16/337 |
| 10,007,703 B1* | 6/2018 | Collins | G06F 16/24568 |
| 10,289,720 B2* | 5/2019 | Ferrari | G06F 16/284 |
| 10,585,886 B2* | 3/2020 | Ferrari | G06F 16/24539 |
| 2003/0037302 A1 | 2/2003 | Dzienis | |
| 2003/0120665 A1* | 6/2003 | Fox | G06F 16/288 |
| 2003/0163597 A1 | 8/2003 | Hellman | |
| 2012/0011126 A1* | 1/2012 | Park | G06F 9/546 707/769 |
| 2013/0304724 A1* | 11/2013 | Rosjat | G06F 16/2455 707/E17.014 |
| 2013/0339311 A1* | 12/2013 | Ferrari | G06Q 30/0627 707/769 |
| 2013/0339379 A1* | 12/2013 | Ferrari | G06F 16/284 707/766 |
| 2015/0095303 A1* | 4/2015 | Sonmez | G06N 5/01 707/707 |
| 2016/0139886 A1 | 5/2016 | Perdriau et al. | |
| 2016/0357813 A1* | 12/2016 | Ferrari | G06F 16/24539 |
| 2019/0026359 A1* | 1/2019 | Park | G10L 15/14 |
| 2019/0213189 A1* | 7/2019 | Ferrari | G06F 16/24539 |
| 2020/0143795 A1* | 5/2020 | Park | G10L 25/63 |
| 2021/0042299 A1* | 2/2021 | Migliori | G06F 9/4401 |

FOREIGN PATENT DOCUMENTS

| | | |
|---|---|---|
| CN | 102929898 A | 2/2013 |
| CN | 105308593 A | 2/2016 |
| CN | 106230859 A | 12/2016 |
| JP | 2006050062 A | 2/2006 |
| WO | 2006111011 A1 | 10/2006 |
| WO | WO 2016128415 A1 | 8/2016 |

OTHER PUBLICATIONS

Pan Shilong et al.: "Optical NRZ to RZ format conversion based on a frequency-doubling optoelectronic oscillator", p. 797-798, Dec. 1, 2009.

Zhang Yingjian et al.:"Design and Implementation of Device-Independent Programming for Control Unit", journal of donghua university , vol. 36, No. 3, Jun. 30, 2010.

Zhang Jing et al.:"XML-based power quality data sharing model and cross-platform data exchange", electric power automation equipment, vol. 27, No. 12, p. 88-92, Dec. 31, 2007.

* cited by examiner

DEVICE AND METHOD FOR COUPLING A MACHINE TO A PLURALITY OF APPLICATIONS

CROSS-REFERENCE TO RELATED APPLICATIONS

This application claims priority to PCT Application No. PCT/EP2018/068699, having a filing date of Jul. 10, 2018, which is based on European Application No. 17187207.0, having a filing date of Aug. 22, 2017, the entire contents both of which are hereby incorporated by reference.

FIELD OF TECHNOLOGY

The following relates to a device for coupling a machine, in particular a machine tool, having a number of data sources for providing data of the machine in data-source-specific data formats to a plurality of applications. Furthermore, the following relates to a method and a computer program product which causes the method to be carried out on a program-controlled device.

BACKGROUND

The technical field of embodiments of the invention relates in particular to edge computing, in which basic functions of control devices of machine tools, such as Sinumerik, Simotion or Simatic, and of further field devices and sensors, such as cameras, for example, are extended by powerful applications on additional hardware. By way of example, such applications optimize NC programs (NC; numerical control) with regard to speed, wear, energy expenditure and other properties of production processes. Furthermore, applications are known which warn about imminent machine or component failures, plan optimum maintenance cycles and proactively give advice for predictive maintenance tasks. There are numerous possibilities for use of such applications.

However, data sources, such as sensors or actuators, for example, of the machine provide their data which are intended to be processed by such applications conventionally in data-source-specific data formats. Consequently, an application is conventionally constructed in such a way that it can process data in the respective data-source-specific data format. Thus, the respective application is conventionally constructed specifically for a device or a machine, even though the device shares similar properties with other types of devices.

In other words, conventionally there is no data interoperability here. The machines or devices have not been developed for this. That is to say that conventionally an application created for a field device A does not automatically function with a field device B. Accordingly, applications are conventionally programmed in a device-specific manner. If an application is intended to be used for a further device as well, then re-engineering or rewriting of the application is necessary.

Even a standardization of the interfaces solves this problem of the lack of data interoperability only to a limited extent, since the standardization of interfaces only ever permits a lowest common dominator of functionality and quality, in particular performance of the data transfer. One example of such a standard is OPC UA (UA; unified architecture). OPC UA is an industrial M2M communication protocol. By way of example, however, even in the case of OPC UA, no device-specific high-frequency data, such as positions, rotational speed and currents, in the case of position, rotational speed and current control loops therefor usually a frequency of 500 Hz or higher, are transferred to the applications.

SUMMARY

An aspect relates to the coupling of a machine, in particular the communication-technological coupling, to a plurality of applications.

In accordance with a first aspect, a device for coupling a machine, in particular a machine tool, having a number N of data sources for providing data of the machine in data-source-specific data formats to a plurality of applications is proposed. The device comprises a transformation unit configured to transform data of one of the N data sources present in one of the data-source-specific data formats into data of a generic semantic data model for the applications and/or to transform data of one of the applications present in the generic semantic data model into data of one of the data-source-specific data formats for one of the N data sources.

The transformation unit improves the communication-technological coupling between the machine and the applications. In particular, the transformation unit produces data interoperability between the respective application and the respective data source of the machine.

By virtue of the fact that the application utilizes a generic semantic data model, the application can be used for a plurality of different data sources, which can also use different data-source-specific data formats. Furthermore, on account of this the respective application can also be used for different machines.

On account of the functionality of the transformation unit, the application can utilize the generic semantic data model, thereby advantageously enabling an application developer to write applications for different machines and/or data sources rapidly and cost-effectively. On account of the functionality of the transformation unit, an application which functions with a specific machine can also be used for other similar machines.

The data interoperability created may be a major building block for an edge computing system in which third-party providers of applications can offer applications all around an edge computing hardware and software platform.

The machine is for example a machine tool or a device, such as a field device. The machine is controlled by a control device, such as a Sinumerik, a Simotion or a Simatic, for example. The proposed device is for example embodied as an edge controller and able to be coupled to the control device of the machine.

Examples of data sources which provide their data in data-source-specific data formats comprise sensors arranged on the machine, cameras for recording images of the machine, microphones for recording sound in a region of the machine, and actuators of the machine.

The data-source-specific data format is specific to the outputting data source and thus not generic and is based on a simple numerical code, for example.

An application is application software, or an application program executed as a computer program, for example, in order to process or to support a functionality, or in order to evaluate data of the machine. By way of example, an application can optimize an NC program with regard to speed, wear, energy expenditure or further properties of production processes. Other applications can for example warn about imminent machine or component failures of the machines, plan optimum maintenance cycles of the machine and/or proactively give advice for predictive maintenance of the machine.

The application utilizes the generic semantic data model and is thus not specific to a machine or a certain device. In particular, the generic semantic data model is a generic data model which describes one or more technical or process engineering domains, for example of machine tools.

In accordance with one embodiment, the transformation unit has a first transformation means or a first transformation unit and a second transformation means or second transformation unit. In this case, the first transformation means or the first transformation unit is configured to transform the data present in one of the data-source-specific data formats into data of a data-source-specific semantic data model. Furthermore, the second transformation means or the second transformation unit is configured to transform the data of the data-source-specific semantic data model into the data of the generic semantic data model.

In accordance with a further embodiment, the transformation unit furthermore has a third transformation means or the third transformation unit and a fourth transformation means or a fourth transformation unit. In this case, the third transformation means is configured to transform the data of the generic semantic data model from one of the applications into data of one of the data-source-specific semantic data models for one of the N data sources. Furthermore, the fourth transformation means is configured to transform the data of the data-source-specific semantic data model into data of the data-source-specific data format of the data source.

In accordance with a further embodiment, the second transformation means is configured to transform the data of the data-source-specific semantic data model into the data of the generic semantic data model by means of a semantic mapping, wherein the third transformation means is configured to transform the data of the generic semantic data model from one of the applications into the data of one of the data-source-specific semantic data models for one of the N data sources by means of an inverse semantic mapping.

The semantic mapping comprises mapping rules linking the generic semantic data model with data-source-specific semantic data models. The logic of the linking here can be for example an inheritance at the concept level (e.g. a shaft is a machine component), an inheritance at the relation level (e.g. drilling inherits from processes) or an invertible, arbitrarily complex and nested mathematical function (e.g. rotations/min=rotations/s·60). In addition, any type of complex, logical mapping function may be possible as part of the semantic mapping. In particular, a set of semantic mappings that maps data-source-specific semantic data models onto the generic semantic data model is used per data source. The format of the respective mapping or mapping specification is in the form of axioms, also in combination with semantic rules and mathematical functions if there is a need for a higher expressiveness for the mappings.

The proposed transformation means or transformation unit have the advantage of creating an intermediate level during the translation between data-source-specific data formats and generic semantic data model, namely the data-source-specific semantic data models. This intermediate level of the data-source-specific semantic data models has the advantage that in particular the mapping or the translation between data-source-specific data format and data-source-specific semantic data model can be created in an automated manner, including in an automated manner in conception.

The following example may illustrate the functionality of the proposed device or the transformation unit: an application may subscribe to data of certain data sources of a machine. For this purpose, the application may use a subscription on the basis of the generic semantic data model. By virtue of the fact that the application may use a subscription on the basis of the generic semantic data model, it is not necessary for the application, in the course of its subscription, either explicitly to name specific data sources or to know the specific data models or data formats thereof.

A set of assigned subscriptions of applications may be provided for each data source. A semantic subscription mapping of subscriptions in the generic semantic data model, provided by the applications, onto the set of assigned subscriptions in the data-source-specific data formats may be provided for this purpose. Besides the subscriptions of the applications in the generic semantic data model, the semantic subscription mapping utilizes a semantic mapping between the data-source-specific data formats or the data-source-specific semantic data models and the generic semantic data model.

The mapping between data-source-specific semantic data model and generic semantic data model is used if the transformation unit has the transformation means for providing the intermediate level. Otherwise, the transformation unit utilizes a direct mapping between the respective data-source-specific data format and the generic semantic data model.

The respective data-source-specific semantic data model is a data source for the semantic description of the concepts, relations and properties of data, made available by the respective data sources. Such a description is specific to the respective data source and specifies the data interface with the data source, for example with the sensor or the actuator.

In accordance with a further embodiment, the device is embodied as an edge controller which is able to be coupled to a control device for controlling the machine.

The edge controller is able to be coupled to the central control device of the machine. The edge controller is thus additional hardware for the control device. For the example of Sinumerik as control device, the edge controller can also be referred to as a Sinumerik edge box.

In accordance with a further embodiment, the device is embodied as a controller which is integrated in a control device for controlling the machine.

In this embodiment, the proposed device is integrated in the control device.

In accordance with a further embodiment, the device is embodied as an FPGA (field programmable gate array) or as an ASIC (application specific integrated circuit).

The embodiment as an FPGA or as an ASIC has advantages in terms of performance and costs.

In accordance with a further embodiment, the generic semantic data model comprises entities concerning the machine, properties of the entities and/or relationships between two or more of the entities.

In accordance with a further embodiment, the generic semantic data model is structured in a hierarchy of semantic abstraction levels. In this case, a specific partial data model is assigned to the respective abstraction level.

Advantageously, different abstraction levels can be used in this embodiment.

In accordance with a further embodiment, the specific partial data models structured in the hierarchy comprise a semantic IoT model (IoT; Internet of things), a generic semantic machine tool model, a semantic manufacturer model assigned to the manufacturer of the machine tool, and/or a semantic end user model.

The more abstract a certain partial data model, the more complex the programming of an application that uses data on the basis of this partial data model. However, it is possible to use an abstract data model for starting up the application and subsequently to extend it by more specific partial data models at the run time. By way of example, a very generic IoT model can be extended by domain-specific models, such as, for example, a machine tool model, a milling process model, or an alloy wheel milling process model, without already existing applications needing to be changed.

In accordance with a further embodiment, provision is made of a subscription unit configured to receive a subscription of one of the applications to specific data of the N data sources, wherein the subscription has at least one axiom comprising at least one of the entities, at least one of the properties of the entities and/or at least one of the relationships of the generic semantic data model.

The subscription is based on one or more axioms from the generic semantic data model. By way of example, a certain application asks for X-, Y-, and Z-axis position data of a mounted tool in three-dimensional space on the basis of the generic semantic data model.

Semantic subscription mapping mentioned above can implement mapping specifications in order to map the set of subscriptions of an application from the generic semantic data model onto correspondingly logic correct and completely mapped sets of subscriptions in data-source-specific semantic data models and/or data-source-specific data formats.

Following the subscription, applications can be informed about new data in accordance with their subscriptions, although not with the format and semantics of the data in the respective data-source-specific semantic data model or data-source-specific data format, but rather with the format and semantics of the same data in the generic semantic data models.

For this purpose, a providing unit is provided. The providing unit is configured to provide to the respective application, on the basis of its subscription received by the subscription unit, the data supplied by the data sources and transformed into the generic semantic data model by the transformation unit.

In particular, the providing unit performs the provision of the data at the run time. The providing unit, too, is realized in hardware, for example as an FPGA or as an ASIC, on account of performance and cost reasons. However, a software solution is also possible for the providing unit. The providing unit in particular also implements mapping specifications in order to map the data of the data sources from the semantics of the data-source-specific semantic data models and/or the data-source-specific data formats onto the semantics of the generic data model which is expected by the subscribed applications.

In accordance with a further embodiment, the providing unit is furthermore configured to provide to an application, on the basis of a request by the application which is directed at data of a certain data source, even without a subscription, the data supplied by the certain data source and transformed into the generic semantic data model by the transformation unit.

In accordance with a further embodiment, the N data sources comprise at least one sensor arranged on the machine tool, at least one camera for recording images of the machine tool, at least one microphone for recording sound in a region of the machine tool, and/or at least one actuator of the machine tool.

The respective unit, for example the transformation unit, the subscription unit or the providing unit, can be implemented as hardware technology and/or else as software technology. In the case of an implementation as hardware technology, the respective unit can be embodied as a device or as part of a device, for example as a computer or as a microprocessor or as a control computer of a vehicle. In the case of an implementation as software technology, the respective unit can be embodied as a computer program product (non-transitory computer readable storage medium having instructions, which when executed by a processor, perform actions), as a function, as a routine, as part of a program code or as an executable object.

In accordance with a second aspect, an arrangement comprising a machine, in particular a machine tool, having a number N of data sources for providing data of the machine in data-source-specific data formats, a plurality of applications and a device for coupling the machine to the applications in accordance with the first aspect or one of the embodiments of the first aspect is proposed. The arrangement is an edge computing system, for example.

In accordance with a third aspect, a method for coupling a machine, in particular a machine tool, having a number N of data sources for providing data of the machine in data-source-specific data formats to a plurality of applications is proposed. The method comprises transforming data of one of the N data sources present in one of the data-source-specific data formats into data of a generic semantic data model for one of the applications and/or transforming data of one of the applications present in the generic semantic data model into data of one of the data-source-specific data formats for one of the N data sources.

The embodiments and features described for the proposed device are correspondingly applicable to the proposed method.

In accordance with a fourth aspect, a computer program product is proposed which causes the method in accordance with the second aspect as explained above to be carried out on a program-controlled device.

A computer program product, such as e.g. a computer program means, can be provided or supplied for example as a storage medium, such as e.g. a memory card, USB stick, CD-ROM, DVD, or else in the form of a downloadable file from a server in a network. This can be effected for example in a wireless communication network by means of the transfer of a corresponding file with the computer program product or the computer program means.

Further possible implementations of embodiments of the invention also encompass not explicitly mentioned combinations of features or embodiments described above or below with respect to the exemplary embodiments. In this case, the person skilled in the art will also add individual aspects as improvements or supplementations to the respective basic form of embodiments of the invention.

BRIEF DESCRIPTION

Some of the embodiments will be described in detail, with reference to the following figures, wherein like designations denote like members, wherein.

DETAILED DESCRIPTION

Figure 1:
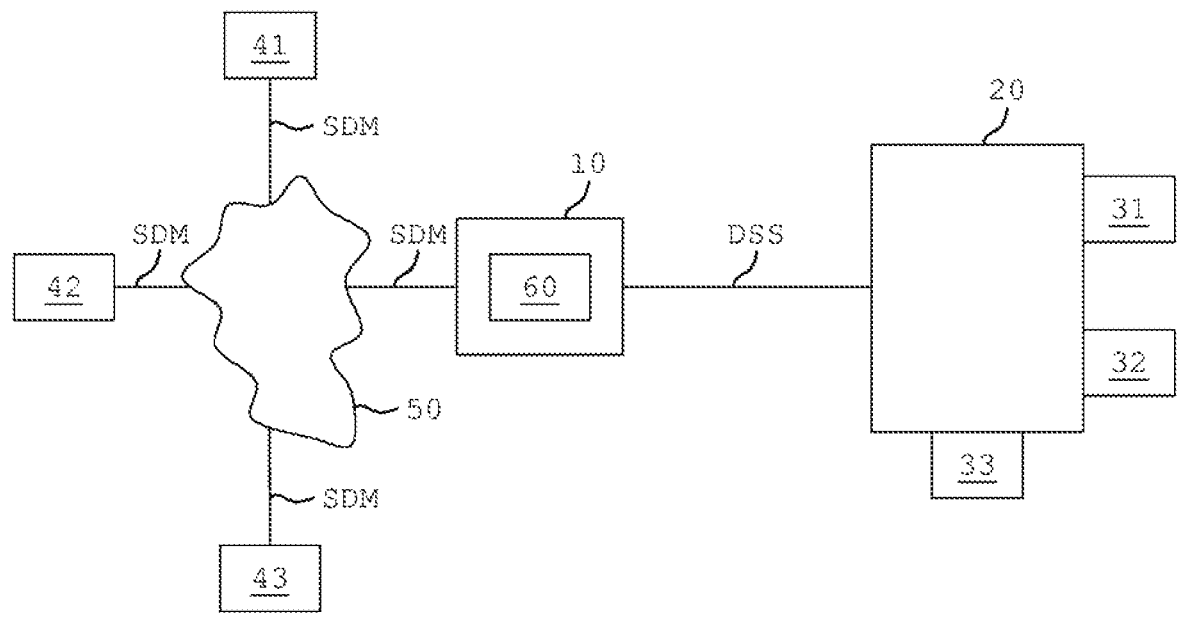
FIG. 1 shows a schematic block diagram of a first exemplary embodiment of an arrangement comprising a machine, a plurality of applications and a device for coupling the machine to the applications.

FIG. 1 shows a schematic block diagram of a first exemplary embodiment of an arrangement comprising a device 10 for coupling a machine 20 having a number N of data sources 31-33 for providing data of the machine 20 in data-source-specific data formats DSS to a number of applications 41-43.

The device 10 in FIG. 1 couples the machine 20 to the applications 41-43. By way of example, the device 10 is connected to the applications 41-43 via a network 50, for example a LAN (LAN; local area network) and/or the internet. Without limiting the generality, FIG. 1 shows three applications 41-43. The respective application 41-43 is part of a computer or of a server or is executed by such.

The machine 20 in FIG. 1 is a machine tool, for example. Three data sources 31-33 are assigned to the machine tool 20 in FIG. 1. Without limiting the generality, the number of data sources 31-33 is three in FIG. 1 (N=3).

Examples of the data sources 31-33 comprise sensors arranged on the machine tool 20, cameras for recording images of the machine tool 20, microphone for recording sound in a region of the machine tool 20, and/or actuators of the machine tool 20. The data sources 31-33 provide their data in data-source-specific data formats DSS. The data-source-specific data formats DSS utilized by the different data sources 31-33 are regularly different with respect to one another.

The device 10 comprises a transformation unit 60. The transformation unit 60 is configured to transform data of one of the N data sources 31-33 present in one of the data-source-specific data formats DSS into data of a generic semantic data model SDM for the applications 41-43.

Furthermore, the transformation unit 60 is configured to transform data of one of the applications 41-43 present in the generic semantic data model SDM into data of one of the data-source-specific data formats DSS for one of the N data sources 31-33.

The generic semantic data model SDM comprises entities concerning the machine 20, properties of the entities and/or relationships between two or more of the entities. By way of example, the generic semantic data model SDM is structured in a hierarchy of semantic abstraction levels. In this case, a specific partial data model is assigned to the respective abstraction level. The specific partial data models structured in the hierarchy comprise for example a semantic IoT model, a generic semantic machine tool model of the machine tool 20, a semantic manufacturer model assigned to one of the manufacturers of the machine tool 20, and/or a semantic end user model of the end user of the machine tool 20.

Figure 2:
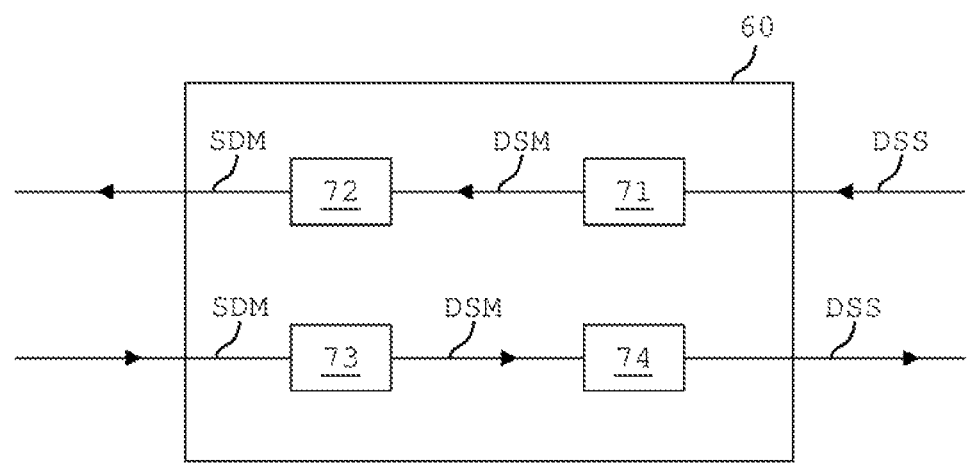
FIG. 2 shows a schematic block diagram of one exemplary embodiment of a transformation unit of the device for coupling the machine to the applications according to FIG. 1.

FIG. 2 shows a schematic block diagram of one exemplary embodiment of a transformation unit 60 of the device 10 for coupling the machine 20 to the applications 41-43 according to FIG. 1.

The exemplary embodiment of the transformation unit 60 according to FIG. 2 comprises a first transformation means 71, a second transformation means 72, a third transformation means 73 and a fourth transformation means 74.

In this case, the first transformation means 71 is configured to transform the data present in one of the data-source-specific data formats DSS into data of a data-source-specific semantic data model DSM. Furthermore, the second transformation means 72 is configured to transform the data of the data-source-specific semantic data model DSM into data of the generic semantic data model SDM. The first transformation means 71 and the second transformation means 72 thus handle the data path from the N data sources 31-33 through to the applications 41-43.

The third transformation means 73 and the fourth transformation means 74 are provided for the opposite data path from the applications 41-43 through to the data sources 31-33. In this case, the third transformation means 73 is configured to transform the data of the generic semantic data model SDM from one of the applications 41-43 into data of one of the data-source-specific semantic data models DSM for one of the N data sources 31-33. Furthermore, the fourth transformation means 74 is configured to transform the data of the data-source-specific semantic data model DSM into data of the data-source-specific data format DSS of the data source 31-33 which is intended to be the sink of these data.

Referring further to FIG. 2, the second transformation means 72 is configured in particular to transform the data of the data-source-specific semantic data model DSM into the data of the generic semantic data model SDM by means of a semantic mapping. In this case, the third transformation means 73 is furthermore configured to transform the data of the generic semantic data model SDM from one of the applications 41-43 into the data of one of the data-source-specific semantic data models DSM for one of the N data sources 31-33 by means of an inverse semantic mapping.

Figure 3:
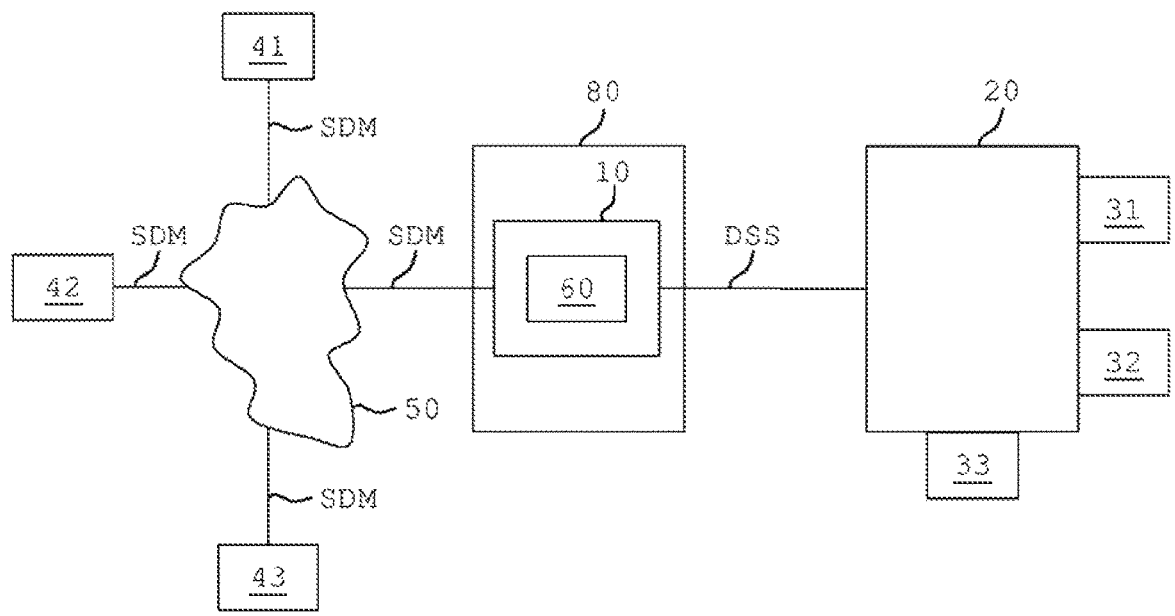
FIG. 3 shows a schematic block diagram of a second exemplary embodiment of an arrangement comprising a machine, a plurality of applications and a device for coupling the machine to the applications.

FIG. 3 illustrates a schematic block diagram of a second exemplary embodiment of an arrangement comprising a machine 20, a plurality of applications 41-43 and a device 10 for coupling the machine 20 to the applications 41-43.

The second exemplary embodiment according to FIG. 3 comprises all the features of the first exemplary embodiment from FIG. 1 and furthermore shows that the device 10 is embodied as a controller which is integrated in a control device 80 for controlling the machine 20. In this case, the control device 80 is a Sinumerik, a Simotion or a Simatic, for example.

Figure 4:
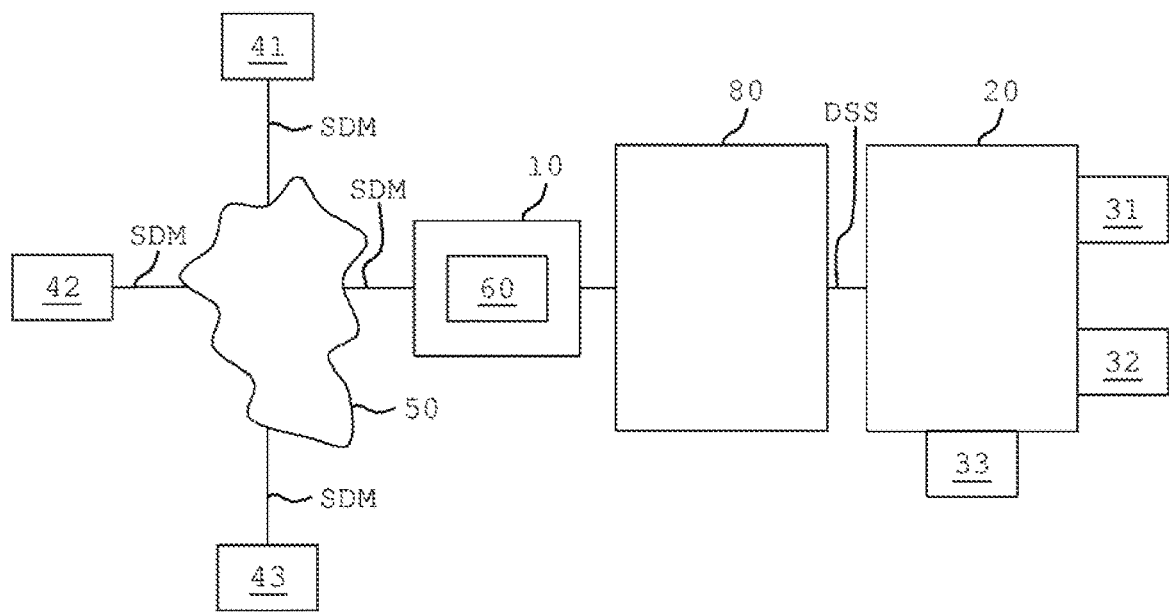
FIG. 4 shows a schematic block diagram of a third exemplary embodiment of an arrangement comprising a machine, a plurality of applications and a device for coupling the machine to the applications.

FIG. 4 shows a schematic block diagram of a third exemplary embodiment of an arrangement comprising a machine 20, a plurality of applications 41-43 and a device 10 for coupling the machine 20 to the applications.

The third exemplary embodiment according to FIG. 4 differs from the second exemplary embodiment according to FIG. 3 to the effect that the device 10 is embodied as an edge controller which is not integrated in the control device 80, but rather is able to be arranged alongside the control device 80 and is able to be coupled to the control device 80. The edge controller 10 in FIG. 4 thus constitutes additional hardware for the control device 80 according to FIG. 4.

Figure 5:
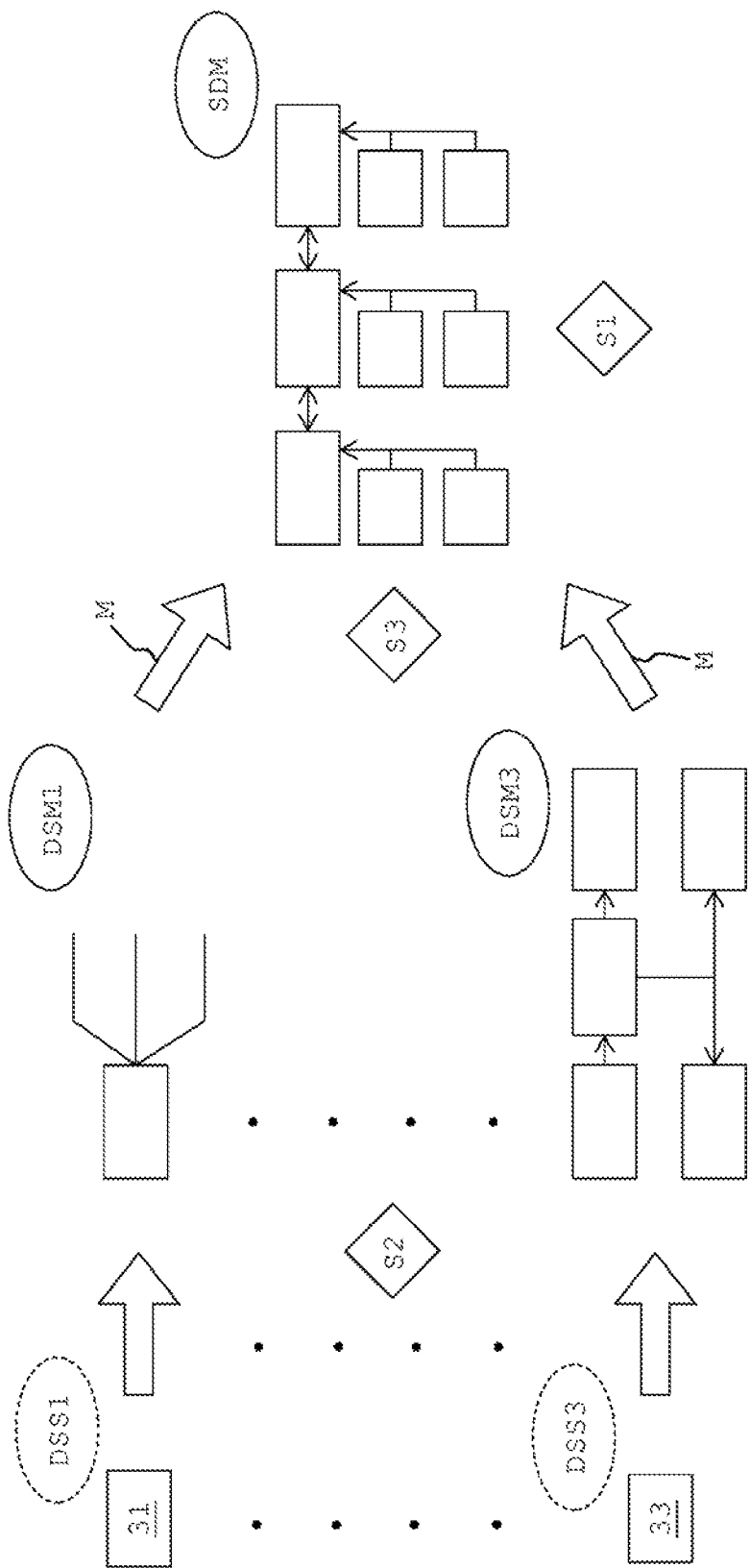
FIG. 5 shows a schematic diagram for illustrating aspects of a method for coupling a machine to applications.
Figure 6:
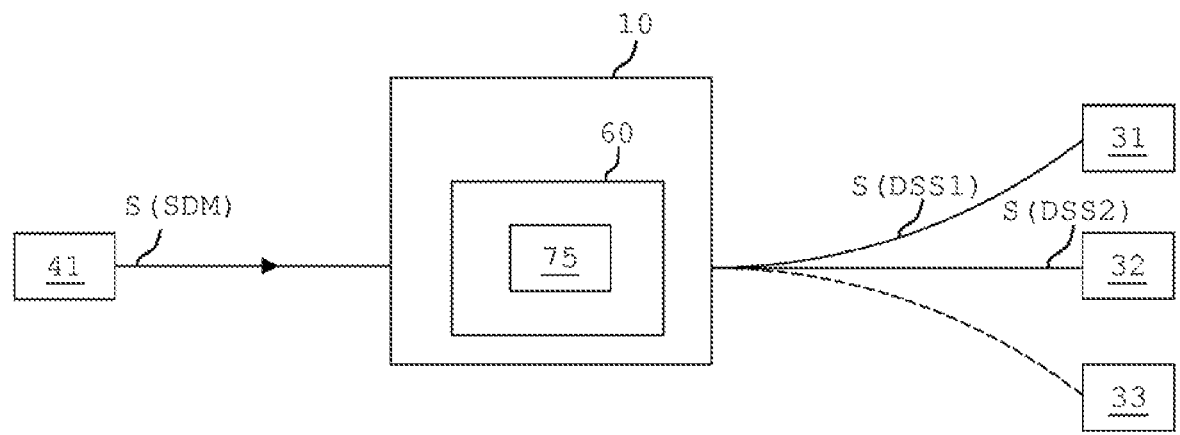
FIG. 6 shows a schematic diagram for illustrating further aspects of a method for coupling a machine to applications.
Figure 7:
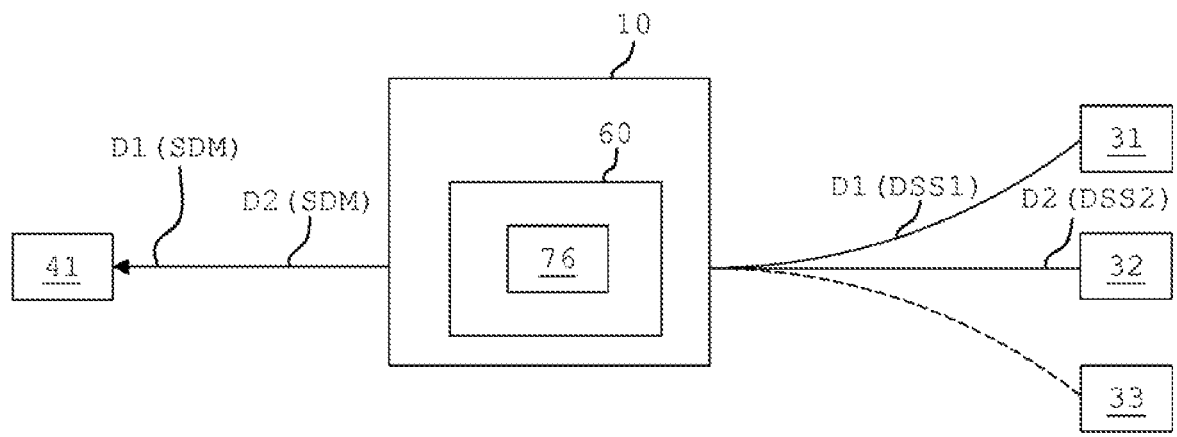
FIG. 7 shows a schematic diagram for illustrating further aspects of a method for coupling a machine to applications.

FIGS. 5 to 7 show aspects of a method for coupling a machine 20, in particular a machine tool, having a number N of data sources 31-33 for providing data of the machine 20 in data-source-specific data formats DSS to a plurality of applications 41-43. Arrangements comprising such a machine 20 and such applications 41-43 are illustrated for example in FIGS. 1, 3 and 4.

In particular, FIG. 5 shows method steps for the design of the device 10 for coupling the machine 20 to the applications 41-43, as illustrated by way of example in FIGS. 1, 3 and 4.

In FIG. 5, an ellipse having a solid line denotes a data model, an ellipse having a dashed line denotes a data format, and a rhombus denotes a method step.

The example in FIG. 5 comprises the three method steps S1-S3:

In step S1, a generic semantic data model SDM is defined for the corresponding machine 20 or the assigned data sources 31-33 thereof. The data model SDM is suitable for being used for a plurality of applications 41-43 in a domain. In the present example, the generic semantic data model SDM is a machine tool domain data model. By way of example, the generic semantic data model SDM is present in a semantic data model description language, in OWL/RDF.

In step S2, the data-source-specific data format DSS1 of the data source 31, the data-source-specific data format DSS2 of the data source 32 and the data-source-specific data format DSS3 of the data source 33 are translated into data-source-specific semantic data models DSM1-DSM3. The data-source-specific data formats DSS DSS3 are regularly different with respect to one another. However, it is also possible for two of the data-source-specific data formats DSS1 and DSS3, for example, to be identical, such that the corresponding data-source-specific semantic data models DSM1 and DSM3 would then also be identical (not so in the example in FIG. 5).

The translation or extraction from DSS to DSM in step S2 is based for example on specifications, published data models and/or on run time interrogations of the data schemas, for example OPC UA data model requests. The DSM (DSM1-DSM3) are present in a semantic data model description language, in OWL/RDF, at the end of step S2.

Step S3 involves defining semantic mappings M between the individual DSM (DSM1-DSM3) and SDM (in each case a separate set of mappings per DSM). The semantic mappings M can be created by means of axioms from a description logic, by means of rules and invertible mathematical functions. The format of the mapping set M is OWL/RDF with optional extensions for semantic rules and semantically described functions. The following are made available in particular as input to the device 10, in particular the transformation unit 60: DSS1-DSS3, DSM1-DSM3, all M and SDM.

After successful configuration of the device 10 in accordance with FIG. 5, the applications 41-43 can subscribe for data of the data sources 31-33 at the device 10.

In this respect, FIG. 6 shows an example in which the device 10 couples the data sources 31-33 to the application 41. The transformation unit 60 in FIG. 6 comprises a subscription unit 75. The subscription unit 75 is configured to receive a subscription S of the application 41 to specific data of the data sources 31-33. By way of example, the application 41 subscribes with its subscription S to data of the data source 31 and of the data source 32. The subscription S has at least one axiom comprising at least one of the entities, at least one of the properties of the entities, and/or at least one of the relationships of the generic semantic data model SDM. The subscription S may also be referred to as subscription request.

After the device 10 has been configured and after the start, the subscription unit 75 waits for subscription requests S of the applications 41-43. The subscription requests S are represented on the basis of the semantics of SDM; consequently, the respective application 41-43 knows the generic semantic data model SDM and does not have to know DSS or DSM. This enables an application developer to develop the applications 41-43 independently of the type and number of the concrete data sources 31-33.

If the subscription unit 75 receives a valid subscription S in the SDM semantics, then the subscription unit 75 translates it into one or more subscriptions in DSS. In this respect, FIG. 6 shows the subscription S in SDM as S(SDM). The translated subscription for the data source 31 reads S(DSS1) and the translated subscription for the data source 31 reads S(DSS2). A desubscription is correspondingly possible.

After successful configuration and subscription, the device 10 can be used during the operation of the machine 20. By this means, data originating from the data sources 31-33 can then be made available to the subscribed application 41. This is illustrated by way of example in FIG. 7. For this purpose, the transformation unit 60 in FIG. 7 comprises a providing unit 76. The providing unit 76 is configured to provide to the subscribed application 41, on the basis of its subscription S received by the subscription unit 75 (see FIG. 6), the data supplied by the data sources, by the data sources 31 and 32 in the present example, and transformed into the generic semantic data model SDM by the transformation unit 60.

As illustrated above, in the present example the application 41 is subscribed for data of the data source 31 and for data of the data source 32. In accordance with FIG. 7, the data source 31 provides first data D1(DSS1) in a first data-source-specific data format DSS1 to the device 10. Correspondingly, the second data source 32 provides its data D2(DSS2) in a second data-source-specific data format DSS2. The transformation unit 60 translates D1(DSS1) into D1(SDM) and D2(DSS2) into D2(SDM). The data D1(SDM) and D2(SDM) translated into the generic semantic data model SDM are provided to the subscribed application 41 by the providing unit 76.

Figure 8:
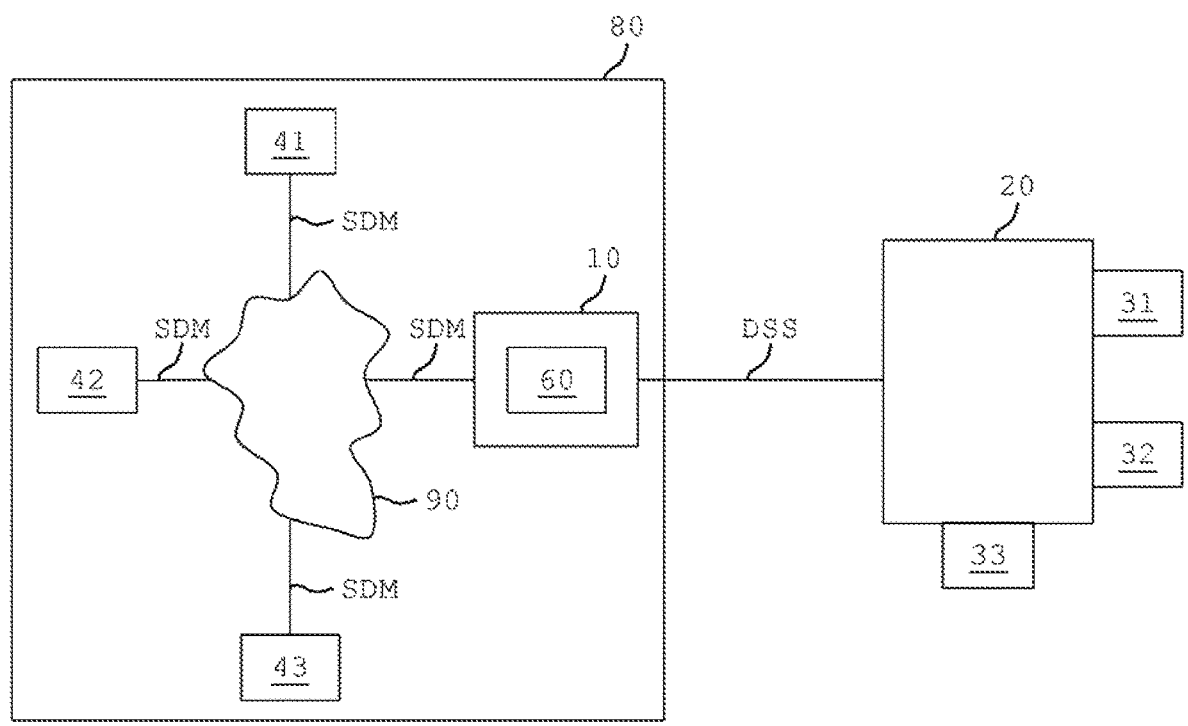
FIG. 8 shows a schematic block diagram of a fourth exemplary embodiment of an arrangement comprising a machine, a plurality of applications and a device for coupling the machine to the applications.

FIG. 8 illustrates a schematic block diagram of a fourth exemplary embodiment of an arrangement comprising a machine 20, a plurality of applications 41-43 and a device 10 for coupling the machine 20 to the applications 41-43.

The fourth exemplary embodiment according to FIG. 8 comprises all the features of the first exemplary embodiment from FIG. 1 and furthermore shows an edge box 80, for example a SINUMERIK edge box.

The edge box 80 in FIG. 8 comprises the device 10 and the applications 41-43. The device 10 and the applications 41-43 are connected by means of a data bus 90. The machine 20 can also be connected via the data bus 90 (not shown in FIG. 8).

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A device for coupling a machine tool or field device, having a number N of data sources for providing data of the machine tool or field device in data-source-specific data formats, to a plurality of applications, wherein the N data sources include a sensor and/or an actuator of the machine tool or field device, the device comprising:
    a transformation unit comprising a processor configured to receive data source data of one of the N data sources present in one of the data-source-specific data formats (DSS), transform the received data source data into data of a generic semantic data model for the applications, and to provide the transformed data source data to at least one application of the applications and/or to receive application data of one of the applications present in the generic semantic data model (SDM), transform the received application data into data of one of the data-source-specific data formats for one of the N data sources, and provide the transformed application data to the machine tool or field device and/or to the one of the N data sources,
    wherein the transformation unit has a first transformation unit and a second transformation unit, wherein the first transformation unit is configured to transform the data source data present in one of the data-source-specific data formats into data of a data-source-specific semantic data model, and wherein the second transformation unit is configured to transform the data of the data-source-specific semantic data model into the data of the generic semantic data model,
    wherein the transformation unit furthermore has a third transformation unit and a fourth transformation unit, wherein the third transformation unit is configured to transform the application data of the generic semantic data model from one of the applications into data of one of the data-source-specific semantic data models for one of the N data sources, and wherein the fourth transformation unit is configured to transform the data of the data-source-specific semantic data model into data of the data-source-specific data format of the data source,
    wherein the transformation unit is configured to transform the data of the data-source-specific semantic data model into the data of the generic semantic data model by a semantic mapping, and wherein the transformation unit is configured to transform the data of the generic semantic data model from one of the applications into the data of one of the data-source-specific semantic data models for one of the N data sources by an inverse semantic mapping,
    wherein the semantic mapping includes mapping rules for linking the generic semantic data model with data source-specific semantic data models, with the logic of the link being inheritance at the concept level, inheritance at the relation level, or an invertible mathematical function,
    the respective data source-specific semantic data model is a data model for the semantic description of concepts, relationships and properties of data that can be made available from the respective data source,
    wherein the generic semantic data model comprises entities concerning the machine tool, properties of the entities, and/or relationships between two or more of the entities, and
    wherein the device is integrated into a controller of the machine tool or field device or is an edge controller for the machine tool or field device.

2. The device as claimed in claim 1, wherein the device is embodied as an FPGA or as an ASIC.

3. The device as claimed in claim 1, wherein the generic semantic data model is structured in a hierarchy of semantic abstraction levels, wherein a specific partial data model is assigned to the respective abstraction level.

4. The device as claimed in claim 3, wherein the specific partial data models structured in the hierarchy comprise a semantic IoT model, a generic semantic machine tool model, a semantic manufacturer model assigned to the manufacturer of the machine tool, and/or a semantic end user model.

5. The device as claimed in claim 1, wherein the device has a subscription unit configured to receive a subscription of one of the applications to specific data of the N data sources, wherein the subscription has at least one axiom comprising at least one of the entities, at least one of the properties of the entities and/or at least one of the relationships of the generic semantic data model.

6. The device as claimed in claim 5, wherein the device has a providing unit configured to provide to the respective application, on the basis of its subscription received by the subscription unit, the data supplied by the data sources and transformed into the generic semantic data model by the transformation unit.

7. The device as claimed in claim 1, wherein the N data sources comprise at least one camera for recording images of the machine tool or field device and/or at least one microphone for recording sound in a region of the machine tool or field device.

8. A method for coupling a machine tool or field device, having a number N of data sources for providing data of the machine tool or field device in data-source-specific data formats to a plurality of applications, wherein the number N of data sources include a sensor and/or an actuator of the machine tool or field device, the method comprising:
    receiving, by a processor, data source data of one of the N data sources present in one of the data-source-specific data formats, transforming the received data source data into data of a generic semantic data model for one of the applications, and providing the transformed data source data to at least the one of the applications; and/or
    receiving application data of one of the applications present in the generic semantic data model, transforming the received application data into data of one of the data-source-specific data formats for one of the N data sources, and providing the transformed application data to at least the one of the N data sources,
    wherein a first transformation unit transforms the data source data present in one of the data-source-specific data formats into data of a data-source-specific semantic data model, and wherein a second transformation unit transforms the data of the data-source-specific semantic data model into the data of the generic semantic data model,
    wherein a third transformation unit transforms the application data of the generic semantic data model from one of the applications into data of one of the data-source-specific semantic data models for one of the N data sources, and wherein a fourth transformation unit transforms the data of the data-source-specific semantic data model into data of the data-source-specific data format of the data source, wherein the data of the data-source-specific semantic data model is transformed into the data of the generic semantic data model by a semantic mapping, and wherein the data of the generic semantic data model from one of the applications is transformed into the data of one of the data-source-specific semantic data models for one of the N data sources by an inverse semantic mapping, wherein the semantic mapping includes mapping rules for linking the generic semantic data model with data source-specific semantic data models, with the logic of the link being inheritance at the concept level, inheritance at the relation level, or an invertible mathematical function, the respective data source-specific semantic data model is a data model for the semantic description of concepts, relationships and properties of data that can be made available from the respective data source, and wherein the generic semantic data model comprises entities concerning the machine tool, properties of the entities, and/or relationships between two or more of the entities.

9. A computer program product, comprising a computer readable hardware storage device having computer readable program code stored therein, said program code executable by a processor of a computer system to implement the method as claimed in claim 8.

\* \* \* \* \*